Patented May 12, 1953

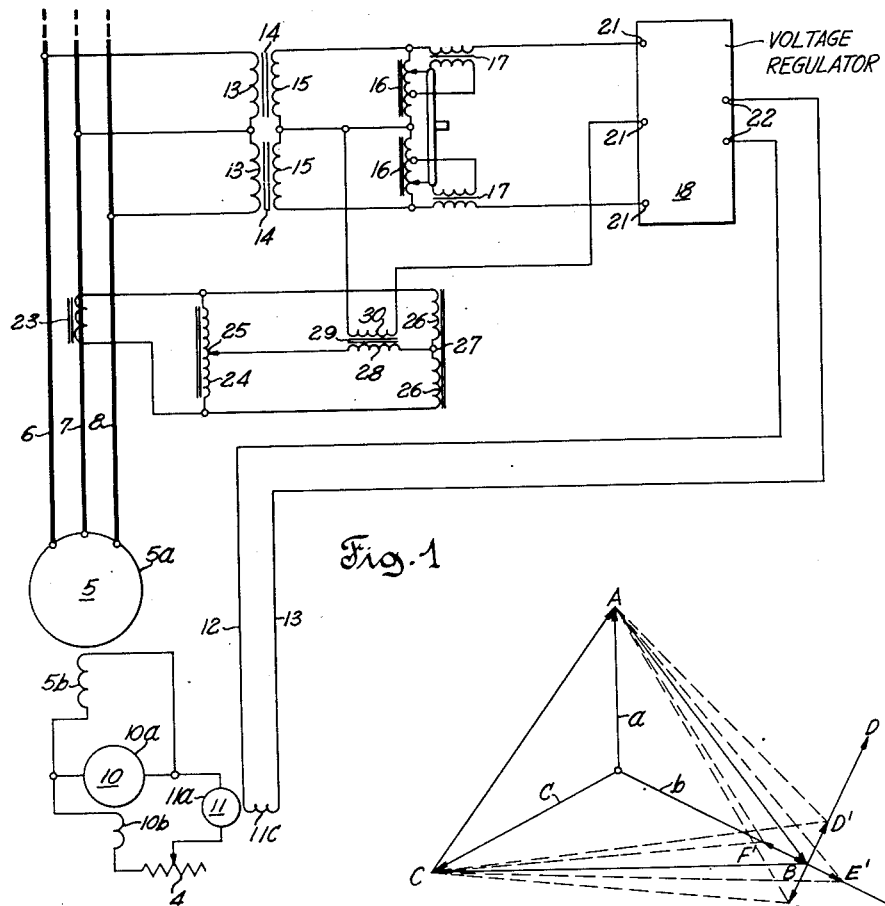
Fig. 1
Fig. 2
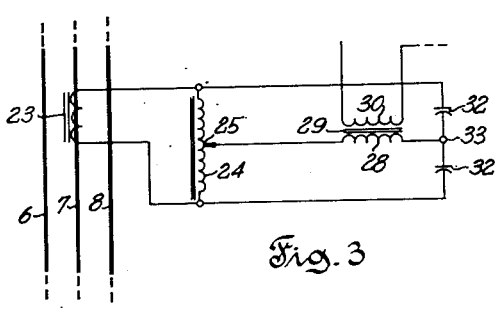
Fig. 3

2,638,570

UNITED STATES PATENT OFFICE 2,638,570

ELECTRIC REGULATING SYSTEM UTILIZING A PHASE REVERSING REACTIVE COMPENSATOR

Daniel J. Sikorra, Milwaukee, Wis., assignor to Allis-Chalmers Manufacturing Company, Milwaukee, Wis.

Application December 2, 1950, Serial No. 198,814

5 Claims. (Cl. 322—24)

This invention relates in general to regulating systems for dynamoelectric machines, and in particular to reactive current compensators for such regulating systems.

When synchronous dynamoelectric machines which are equipped with voltage regulators are connected in parallel directly to a bus bar or through a tie line of negligible impedance, it is customary to reactively under-compound at least one of the machines to avoid an uncontrolled exchange of reactive current between the machines. If a machine is connected to a line through transformers, the reactance of the transformers and the tie line may cause an excessive voltage drop therein, necessitating the reactive over-compounding of the machine to maintain the voltage delivered by the transformer at its desired value. Such over-compounding or under-compounding is usually accomplished by energizing an impedance device by a measure of the current delivered by the machine, usually through one or more current transformers, and impressing the voltage of the impedance device on the voltage regulator in a direction to produce the desired compounding.

However, such systems produce only one type of compounding for a given connection, and require a reversal of the current transformer connections or the impedance device connections to produce the opposite type of compounding. Since it may be desired to operate a given machine under-compounded for a length of time and then, because of a change in operating conditions, operate the machine over-compounded, the above systems have the disadvantages of necessitating the reversal of the connections of the impedance device or the short circuiting of the current transformer to reverse the connections thereof, if it is desired to change the type of compounding provided.

These disadvantages can be overcome by providing a compensator which provides for over-compounding or under-compounding a regulated machine without reversal of any connections or short circuiting of any elements.

It is therefore an object of the present invention to provide an improved reactive drop compensator for regulated dynamoelectric machines.

It is a further object of the present invention to provide a reactive drop compensator which will produce over-compounding or under-compounding of a regulated machine without reversal of any connections or short circuiting of any elements of the compensator.

Objects and advantages other than those outlined above will be readily apparent from the following detailed description when read in connection with the accompanying drawing, in which:

Fig. 1 diagrammatically illlustrates a regulating system embodying the apparatus and circuits of the invention;

Fig. 2 is a diagram vectorially illustrating the relationship between the electric quantities of the regulating system shown in Fig. 1; and Fig. 3 partly illustrates an alternate embodiment of the apparatus and connection of Fig. 1.

Referring to Fig. 1, the invention is shown applied to the regulation of a dynamoelectric machine 5 supplying an alternating current load circuit represented by conductors 6, 7, 8. Machine 5 is provided with an armature 5a and a field winding 5b supplied with excitation current from the armature 10a of a generator 10. Generator 10 is provided with a self-exciting field winding 10b connected to armature 10a in series with an adjustable resistor 4 and the armature 11a, of a buckboost exciter 11. Resistor 4 is preferably so adjusted that field winding 10b provides all the excitation required to maintain the voltage of armature 10a at any given value. Exciter 11 is provided with a control field winding 11c, which is deenergized when the voltage of machine 5 has the desired value and which is directionally energized through conductors 12, 13 from a voltage responsive circuit in response to variations in the voltage of machine 5 above and below the desired value.

Connected across conductors 6, 7, 8 to be energized by the voltage of machine 5 are the primary windings 13 of transformers 14. Secondary windings 15 of transformers 14 are connected to autotransformers 16 and booster transformers 17 to provide a smooth adjustment of the voltage supplied to the voltage responsive circuit. The voltage responsive circuit or regulator, shown in the drawing as block 18, may be of any suitable known type, but is preferably of the nonlinear resonant type disclosed and claimed in my copending application Serial No. 114,751, filed September 9, 1949. The regulator 18 is energized through terminals 21 with three voltages which are measures of the voltages of conductors 6, 7, 8, and the regulator will operate to produce at its output terminals 22 a unidirectional voltage responsive to deviations in the average value of the voltages impressed on terminals 21 from a predetermined value. If no reactive compensator were utilized with regulator 18, it will be understood that the common terminal of transformers 16 would be connected directly to the middle terminal 21 of regulator 18. The output control voltage at terminals 22 will have a polarity and magnitude dependent upon the direction and magnitude of variations in the average value of the voltages impressed on terminals 21 from the predetermined desired value, and this output voltage is supplied to field winding 11c through conductors 12, 13 to produce across armature 11a a voltage of a polarity and magnitude to cause the voltage of machine 5 to return to substantially the predetermined value.

As stated above, it may be desired to either over-compound or under-compound machine 5, and for this purpose, regulator 18 is supplied with a compensating control voltage of variable phase and magnitude. A current transformer 23 is connected to conductor 7 to produce across its terminals a voltage proportional to the current in conductor 7. Connected across current transformer 23 are an autotransformer 24 provided with an adjustable tap 25 and a suitable reactive impedance device, such as an inductive reactor 26, provided with an intermediate tap 27. The primary winding 28 of an isolating transformer 29 is connected between adjustable tap 25 and intermediate tap 27, and the secondary winding 30 of transformer 29 is connected between a terminal 21 of regulator 18 and the common terminal of secondary windings 15. The impedance of autotransformer 24 is considerably higher than the impedance of reactor 26, so that nearly all of the current supplied by current transformer 23 flows through reactor 26 and the power factor of the circuit is determined almost entirely by reactor 26. Autotransformer 24 and reactor 26 form a bridge circuit with input terminals defined by the terminals of current transformer 23 and output terminals represented by intermediate movable tap 25 and intermediate tap 27.

The operation of the compensator may readily be understood by reference to Fig. 2, in which the vectors AB, BC, CA represent the voltages between conductors 6, 7, 8 and the vectors, a, b, c represent the currents in conductors 6, 7, 8, if the load circuit operates at unity power factor. The voltage across reactor 26 and autotransformer 24 will lead the current in current transformer 23 by nearly 90 degrees and will have the position represented by vector BD when the current b is at unity power factor. Assuming that machine 5 is connected directly to a bus bar in parallel with other regulated machines, it is necessary to under-compound machine 5. Under these circumstances, adjustable tap 25 is moved away from the center of autotransformer 24 an amount determined by the amount of compensation desired. This will produce a voltage difference between the terminal 27 and the adjustable tap 25, to impress on primary winding 28 a voltage in phase with voltage BD. Secondary winding 30 will have induced therein a voltage proportional to the voltage of winding 28 and will impress this voltage on regulator 18. This voltage will have a magnitude dependent upon the setting of tap 25 and for a representative compensator, will have a magnitude represented by vector BD'. Regulator 18 will therefore have impressed thereon at its input terminals 21, the voltages AD', D'C, CA and will operate to maintain the average value of voltages AD', D'C, CA constant. However, the average value of these voltages does not differ appreciably from the average value of voltages AB, BC, CA and, the compensator of this invention therefore has a negligible effect upon the operation of regulator 18 at unity power factor.

However, if the power factor of the load circuit becomes lagging for any reason, the voltage of autotransformer 24 and reactor 26 will be retarded in phase, until at 90 degrees lagging power factor the voltage across the compensator elements will be represented by vector BE. This will produce in secondary winding 30 a voltage represented by vector BE' and will cause regulator 18 to maintain the average value of voltages AE', E'C, CA substantially constant. From Fig. 2, it is apparent that the average value of voltages AE', E'C, CA is considerably higher than the average value of voltages AB, BC, CA, and therefore, regulator 18 reduces the voltage of machine 5 through field winding 11c to a value less than the machine voltage at unity power factor. For values of power factor between one and zero, the voltages supplied by the compensator will have vector positions intermediate vectors BD' and BE' to cause the terminal voltage of the machine to decrease with decreasing power factor for producing the desired under-compounding.

If machine 5 should subsequently be connected to a transformer having an appreciable impedance and in which it is desired to maintain a constant output voltage regardless of variations in the power factor of conductors 6, 7, 8, it is necessary to over-compound machine 5. This is accomplished by moving tap 25 to the opposite side of the midpoint of autotransformer 24 an amount dependent upon the amount of compensation desired. This reverses the phase of the voltages of windings 28, 30 so that the voltage impressed on regulator 18 by winding 30 is represented by vector BF at unity power factor. The average value of voltages AF, FC, CA does not differ appreciably from the average value of voltages AB, BC, CA, so that the effect of the compensator is again negligible at unity factor.

At zero power factor the voltage of winding 30 is represented by vector BF', and it is apparent that the average value of voltages AF', F'C, CA is considerably less than the average value of voltages AB, BC, CA, causing regulator 18 to increase the voltage of machine 5. For values of power factor between unity and zero, the voltages of secondary winding 30 have vector positions intermediate vectors BF, BF', so that the voltage of machine 5 is increased in response to variations in the power factor in the load circuit to produce the desired over-compounding. It is apparent that the voltage of secondary winding 30 varies in magnitude in response to variations in the magnitude of the current in conductor 6, so that the control voltage supplied by winding 30 to regulator 18 has a magnitude and phase dependent upon the magnitude and phase of the load current.

If desired, inductive reactor 26 can be replaced by another suitable reactive impedance device, such as a pair of capacitors 32, as shown in Fig. 3, provided with a common terminal 33, to produce the desired compensation. The operation of the compensator with capacitors 32 in place of reactor 26 is identical to that described above except that the phase of the compensating voltage supplied by winding 30 is reversed with respect to its phase when reactor 26 is used, for any given position of tap 25 except the center position. Therefore, to under-compound machine 5 when using capacitors 32, tap 25 of autotransformer 24 is moved to the opposite side of midpoint of autotransformer 24 from its position when under-compounding with reactor 26, and vice versa.

Although but two embodiments have been illustrated and described, it will be apparent to those skilled in the art that various changes and modifications may be made therein without departing from the spirit of the invention or from the scope of the appended claims. In particular, although the compensator of this invention is illustrated in connection with a polyphase load circuit, it will be readily apparent that the compensator will function effectively when utilized in connection with single phase systems.

It is claimed and desired to secure by Letters Patent:

1. In combination, an alternating current generator, a load circuit connected to said generator, regulating means for controlling the voltage of said generator, a current transformer connected in said load circuit, an autotransformer having an intermediate tap, a capacitive impedance device having an intermediate terminal, means connecting said impedance device and said autotransformer in parallel with each other across said current transformer, means connected between said tap and said terminal for producing a control voltage which varies in magnitude and phase in dependence upon the magnitude and phase of said load current, means for varying the adjustment of said tap to reverse the phase of said control voltage, and means for impressing said control voltage on said regulating means to cause said regulating means to vary the voltage of said generator in response to variations in the phase and magnitude of said load current.

2. In combination, an alternating current generator, a load circuit connected to said generator, regulating means for controlling the voltage of said generator, a current transformer connected in said load circuit, an autotransformer having an intermediate tap, a capacitive impedance device having an intermediate terminal, means connecting said impedance device in parallel with said autotransformer across said current transformer, a potential transformer having a primary winding connected between said tap and said terminal to have impressed thereon a voltage varying in magnitude and phase in dependence upon the magnitude and phase of the current in said load circuit, a secondary winding on said potential transformer connected to said regulating means for impressing thereon a control voltage proportional to the voltage of said primary winding to cause said regulating means to vary the voltage of said generator in response to variations in the phase and magnitude of said load current, and means for varying the adjustment of said tap to reverse the phase of said control voltage.

3. In combination, an alternating current generator, a load circuit supplied by said generator, regulating means for controlling the voltage of said generator, and reactive current compensating means comprising a current transformer connected in said load circuit, an autotransformer having a pair of end terminals and an intermediate terminal, a reactive impedance device having a pair of end terminals and an intermediate terminal, means connecting one of said end terminals of said autotransformer to one of said end terminals of said impedance device, means connecting the other of said end terminals of said autotransformer to the other of said end terminals of said impedance device to form a first circuit, means connecting said current transformer across said first circuit, means connected between said intermediate terminals for producing a control voltage having a magnitude and a phase dependent upon the magnitude and the phase of the current in said load circuit, and means for impressing said control voltage on said regulating means to cause said regulating means to vary said generator voltage in response to variations in the magnitude and in the phase of said load current, whereby the magnitude of the voltage at a predetermined point of said load circuit remote from said generator is rendered substantially independent of the phase of said load circuit current.

4. In combination, an alternating current generator, a load circuit supplied by said generator, regulating means for controlling the voltage of said generator, and reactive current compensating means comprising a current transformer connected in said load circuit, an autotransformer having a pair of end terminals and an intermediate terminal, an inductive impedance device having a pair of end terminals and an intermediate terminal, means connecting one of said end terminals of said autotransformer to one of said end terminals of said impedance device, means connecting the other of said end terminals of said autotransformer to the other of said end terminals of said impedance device to form a first circuit, means connecting said current transformer across said first circuit, means connected between said intermediate terminals for producing a control voltage having a magnitude and a phase dependent upon the magnitude and the phase of the current in said load circuit, and means for impressing said control voltage on said regulating means to cause said regulating means to vary said generator voltage in response to variations in the magnitude and in the phase of said load current, whereby the magnitude of the voltage at a predetermined point of said load circuit remote from said generator is rendered substantially independent of the phase of said load circuit current.

5. In combination, an alternating current generator, a load circuit connected to said generator, regulating means for controlling the voltage of said generator, and reactive current compensating means comprising a current transformer connected in said load circuit, an autotransformer having a pair of end terminals and an intermediate tap, a reactive impedance device having a pair of end terminals and an intermediate terminal, means connecting one of said end terminals of said impedance device to one of said end terminals of said autotransformer, means connecting the other of said end terminals of said impedance device to the other of said end terminals of said autotransformer to form a first circuit, means connecting said current transformer across said first circuit, a potential transformer having a primary winding connected between said intermediate tap and said intermediate terminal to have impressed thereon a voltage varying in magnitude and in phase in dependence upon the magnitude and the phase of the current in said load circuit, a secondary winding on said potential transformer connected to said regulating means for impressing thereon a control voltage proportional to the voltage of said primary winding to cause said regulating means to vary said generator voltage in response to variations in the phase and in the magnitude of said load current, whereby the magnitude of the voltage at a predetermined point of said load circuit remote from said generator is rendered substantially independent of the phase of said load circuit current, and means for varying the adjustment of said tap to reverse the phase of said control voltage to change over from overcompounded operation to undercompounded operation.

DANIEL J. SIKORRA.

References Cited in the file of this patent

UNITED STATES PATENTS

| Number | Name | Date |
|---|---|---|
| 1,857,174 | Zucker | May 10, 1932 |
| 2,478,623 | Crary et al. | Aug. 9, 1949 |